United States Patent Office 2,741,644
Patented Apr. 10, 1956

2,741,644

METHODS OF OBTAINING CAROTENE FROM PALM OIL

Pierre Blaizot, Paris, France, assignor to Institut de Recherches pour les Huiles et Oleagineux, Paris, France No Drawing. Application January 21, 1953,
Serial No. 332,571

Claims priority, application France February 10, 1949

2 Claims. (Cl. 260—666)

It is well known that a small percentage of unsaponifiable compounds are present in solution in palm oil, which consist predominantly of all-trans carotenes besides further carotenoid pigments and sterols. For instance, an ordinary palm oil of West-African origin contains about 1 to 1.5 g. of carotene per kilogram.

Carotene is a hydrocarbon the rough formula of which is $C_{40}H_{56}$ and which acts as a provitamin A. There are three isomeric forms of this substance, which are different by the structure of one of the terminal rings. The biological value of $\beta$-carotene is twice that of the two other isomers, $\alpha$ and $\gamma$. Palm oil carotene contains about 65% of the $\beta$-isomer.

In addition to the aforesaid structural isomerism there exists for each of the said three forms of carotene a spatial structure isomerism, or cis-trans-isomerism, which results from the position of two neighboring hydrogen atoms in the aliphatic chain relative to the plane through a double bond.

Such a cis-trans isomerism of carotene is very important since the activity of the various stereo-isomers as provitamins A is considerably variable, the biological activity of the cis-isomers being always materially less than that of the natural all-trans carotene as it occurs in palm oil.

In a study on carotene stereo-isomerism Zechmeister and Polgar pointed out that the general shape of the absorption in the visible spectrum is little affected by cis-trans re-arrangements. Against this, stereo-chemical alterations are attended with alterations in the chemical spectrum between 320 and 380 m$\mu$. In this region and as far as $\beta$-carotene is concerned, the curve is found to go through a maximum and a minimum at 340 ($\pm$2) m$\mu$ and 362 ($\pm$2) m$\mu$ respectively. This phenomenon is known by the term "cis-peak effect."

Consequently, whenever carotene is isolated which is to be used as a generator of vitamin A, it is highly important to avoid any transposition in the same and to keep it in its natural all-trans form.

It is well known that carotene can be prepared from palm oil by subjecting the latter in a first step to an alcoholytic process with the aid of a low-molecular alcohol in the presence of an alkaline catalyst and then, subsequent to the removal of the glycerine, by subjecting the esters thus formed, in which the whole carotene in the palm oil treated is contained in solution, to a distillation step in a vacuum. Once the esters are removed a residue is left which contains the whole of the unsaponifiable fraction of the oil and more particularly the carotene.

For instance, a method of alcoholyzing—and more particularly methanolyzing—palm oil is described in the U. S. Patent No. 2,460,796 to Eckey which is followed with an ordinary, discontinuous distillation of the esters "without the necessity of complicated and unusual apparatus in a vacuum of 0.02 to 0.5 mm. of mercury, it being understood that the temperature may be kept at 135° C. for 15 to 20 hours, at 140° C. for 5 hours and at 150° C. for 2 hours."

However, when this method is carried into effect discontinuously under a pressure of 0.04 mm. in an ordinary vacuum-distillation apparatus, it will be found that the temperature (135–140° C.) and the total time taken (5 hours) are such that the bulk of the carotene which escaped destruction is stereoisomerized and converted into a product the biological value of which is inferiorized considerably.

Likewise, a similar method of alcoholizing palm oil is described in the U. S. Patent No. 2,432,181 to Trent, which is followed with several fractional distillations of the esters and the carotene at temperatures ranging from 165 to 300° C. at pressure less than 10 mm. In the course of the said distillations the carotene passes over with the distillate. In these conditions, again, the carotene is partly decomposed or stereo-isomerized.

In the U. S. Patent No. 2,477,928 to Hartmann and Barnett which relates to the preparation of crystallized carotene from carrots there is pointed out that it is necessary to obtain a carotene solution "without loss of vitamin activity of the carotene due to the molecular rearrangement caused by heating."

On the other hand, succeeding many others, Buckley (Malayan Agr. J. 1935, 23, 315) described the separation of palm oil into a liquid and a solid fraction. The liquid fraction, which consists mainly of unsaturated glycerides, is materially richer in carotene than the original palm oil. The two fractions can be separated easily by pressing, centrifuging or with the aid of selective solvents.

My method consists in preparatorily subjecting the whole oil to an alkaline alcoholysis in order to obtain esters of low-molecular alcohols and removing the glycerine from the esterification mixture. The unsaponifiable fraction and more particularly the unaffected carotene in the palm oil are then obtained by distilling the ester mixture in a vacuum; the carotene, which is identical to the natural product, remains as the residue of the distillation on condition that the temperature is kept below 100 to 110° C., which amounts to say that the process must be carried out in a vacuum of the order of $\frac{1}{1,000}$ to $\frac{1}{10,000}$ mm. of Hg, and this, uninterruptedly so that it can be completed in as little time as possible. No more than a few minutes are required therefor.

Molecular distillation is quite suitable therefor.

An improved modification of my invention consists in processing the liquid richer fraction of the oil rather than the whole oil, since less esters of the liquid fraction of the oil have to undergo the distillation process than esters of the solid fraction and less time is required therefor.

At any rate, as the distillation residue, a mixture is obtained which contains the unsaponifiable constituents of the oil and particularly the carotenes together with that portion of the glycerides which escaped the methanolysis, since only the methyl esters are removed in the vacuum distillation process. It follows that the percentage of unsaponifiable elements and consequently of carotene in the residue will be the higher as the yield of the alcoholysis is closer to 100%. Normally, said yield approximates 97–98%, and where the oil started from contains 1.2% of carotene, a concentrate is obtained which contains 5 to 6% of carotene, i. e., a product which is 40 to 50 times richer than the original oil, and this, in one single step. The carotene is not stereo-isomerized and its curve evidences no "cis-peak." Practically, such a product is suitable for most of the uses of carotene, such as in coloring and enriching margarine and other foodstuffs, enriching fodder, and so on.

In order to obtain a product of higher concentration it is only necessary to saponify the vacuum-distillation residue and to extract the small amount of soap formed with such an organic solvent as petroleum ether, chloroform, and so on. The solvent is then distilled off and an unsaponifiable mixture is obtained which contains the carotenes, other pigments, sterols, etc., and which can be purified, notably by chromatography in the presence of alumina or magnesia. A crystallized product is thus obtained which contains 99.5% of carotene.

*Example 1.*—100 kgs. of neutral palm oil are treated with 30 kgs. of pure methyl alcohol in which 2 to 3% of sodium hydroxide are dissolved. The whole is stirred for a few hours at a temperature of 30 to 40° C., whereby 97 to 98% of the oil is converted into esters. The lower glycerine-containing layer is removed by decantation. The esters are stripped from the excess methanol and distilled in a conventional molecular distillation plant of the kind used for the technical preparation of vitamin A from fish liver oils.

In this manner, by working at a temperature ranging from 80 to 100° C. in a vacuum of the order of $\frac{1}{1,000}$ to $\frac{1}{10,000}$ mms. of Hg the almost colorless methyl esters are driven off and a residue is obtained which contains the unsaponifiable constituents of the palm oil, notably the carotene, in the form of a solution or a suspension in the 2 or 3% oil which escaped the methanolysis.

There are obtained 2.4 kgs. of a concentrate which contains 120 grs. of carotene, i. e., a 5% concentrate, the spectrophotometric curve of which evidences no "cis-peak."

*Example 2.*—The 2.4 kgs. of residue obtained as per Example 1 are treated for 3 hours at a temperature of 60° C. under a nitrogen atmosphere with 4 kgs. of a 10% solution of potassium hydroxide in alcohol. The alcohol is driven off and the residuary soap is extracted with dichlorethane until the solvent is colorless. The dichlorethane is driven off, after which about 400 grs. of a residue are obtained which represent the unsaponifiable fraction of the palm oil and which contain 120 grs. i. e. 30% of carotene.

*Example 3.*—The residue representing the unsaponifiable fraction obtained according to the aforedescribed Example 2 is dissolved in petroleum ether and then chromatographed in a Brockmann's alumina column. The product is eluted with a mixture of petroleum ether with methanol, which makes it possible to isolate the carotene-containing fraction. The solution is evaporated to crystallization. About 99.5% pure mixed α- and β-carotene crystals are thus obtained.

*Example 4.*—100 kgs. of liquid palm oil, obtained by crystallizing and pressing neutral palm oil at a temperature of 16° C. and containing 0.18% of carotene are methanolyzed at a temperature of 25° C. with 30 kgs. of methanol containing 1 kg. of potassium hydroxide in solution. After 3 hours' stirring the mixture is allowed to settle. The methyl esters providing the upper layer are subjected to a molecular distillation process in a vacuum of the order of $\frac{1}{1,000}$ to $\frac{1}{10,000}$ mm. of Hg. The concentrate thus obtained in an amount of about 2 kgs. contains 8.8% of total carotene.

What I claim is:

1. In a method of concentrating and separating the unsaponifiable fraction of palm oil in the form of an undistilled residue having a high content of biologically active natural carotenes, the operations consisting in converting said oil by alkaline alcoholysis into alcohol esters from a low molecular weight alcohol, separating the glycerine fraction and distilling said esters continuously at a temperature below 110° C., in a vacuum ranging from .001 to .0001 mm. Hg during a very short time in a short path distillation apparatus, and extracting the initial carotene from the undistilled residue.

2. In a method of concentrating and separating the unsaponifiable fraction of palm oil in the form of an undistilled residue having a high content of biologically active natural carotenes, the operations consisting in converting the liquid carotene-enriched fraction of said oil by alkaline alcoholysis into alcohol esters from a low molecular weight alcohol, separating the glycerine fraction and distilling said esters continuously at a temperature below 110° C. in a vacuum ranging from .001 to .0001 mm. Hg during a very short time, in a short path distillation apparatus, and extracting the initial carotene from the undistilled residue.

References Cited in the file of this patent

UNITED STATES PATENTS

| 2,652,433 | Blaizot | Sept. 15, 1953 |

FOREIGN PATENTS

| 565,095 | Great Britain | Oct. 26, 1944 |
| 567,682 | Great Britain | Feb. 27, 1945 |